United States Patent [19]
Mouton et al.
[11] Patent Number: 4,755,328
[45] Date of Patent: Jul. 5, 1988

[54] PROCESS FOR TREATING URANIFEROUS SOLUTIONS BY THE ADDITION OF AN ALUMINUM SALT

[75] Inventors: Albert Mouton, Razes; Georges Lyaudet, Limoges, both of France

[73] Assignee: Compagnie Generale des Matieres Nucleaires

[21] Appl. No.: 717,869

[22] Filed: Mar. 29, 1985

[30] Foreign Application Priority Data

Apr. 3, 1984 [FR] France ................................ 84 05243

[51] Int. Cl.[4] ........................ G21F 9/08; C01G 56/00; C02F 1/42

[52] U.S. Cl. .................................... 252/631; 210/667; 210/682; 210/724; 252/626; 423/11; 423/12

[58] Field of Search ........................ 252/631, 635, 627; 423/11, 12, 112, 139, 157, 253, 254, 260-261; 210/682, 724, 667, 726, 738; 75/101 R, 101 BE

[56] References Cited

U.S. PATENT DOCUMENTS

| | | | |
|---|---|---|---|
| 2,761,758 | 9/1956 | Long et al. | 423/12 |
| 2,780,518 | 2/1957 | Gates et al. | 423/12 |
| 2,873,165 | 2/1959 | Bailes et al. | 423/12 |
| 2,885,258 | 5/1959 | Bain | 423/12 |
| 3,029,200 | 4/1962 | Silker | 252/631 |
| 3,449,065 | 6/1969 | Kremer | 423/12 |
| 3,959,172 | 5/1976 | Brownell et al. | 252/631 |
| 4,156,646 | 5/1979 | Schulz | 423/12 |
| 4,269,706 | 5/1981 | Sondermann | 423/12 |
| 4,334,999 | 6/1982 | Cornwell | 423/10 |
| 4,347,141 | 8/1982 | Rothberg | 252/631 |
| 4,423,009 | 12/1983 | Maurel et al. | 423/15 |

FOREIGN PATENT DOCUMENTS

| | | | |
|---|---|---|---|
| 0578514 | 6/1959 | Canada | 423/12 |
| 0043478 | 3/1980 | Japan | 252/631 |
| 0030665 | 3/1980 | Japan | 252/631 |
| 0172598 | 10/1983 | Japan | 252/631 |

*Primary Examiner*—Stephen J. Lechert, Jr.
*Assistant Examiner*—Howard J. Locker
*Attorney, Agent, or Firm*—Larson and Taylor

[57] ABSTRACT

The invention relates to a process for decontaminating and adjusting the pH of uraniferous solutions to render them compatible with the natural environment into which they may be discharged. This process is characterized in that the solutions to be treated having a natural pH from about 2.5 to about 6.5 and containing from about 1 to about 100 mg/l of uranium, are supplemented with an aluminum salt, such as sodium aluminate, in a sufficient amount for the final pH to be from about 5.5 to about 8.5 and for there to be precipitation, coagulation and adsorption of about 90% of the uranium initially contained in the solution and for the uranium content remaining in the final solution obtained to be equal to or less than about 1.8 mg/l.

12 Claims, No Drawings

PROCESS FOR TREATING URANIFEROUS SOLUTIONS BY THE ADDITION OF AN ALUMINUM SALT

BACKGROUND OF THE INVENTION

The invention relates to a process for treating acid solutions, contaminated with uranium.

From a more general point of view, the invention is intended to provide a process for treating acid uraniferous solutions, possibly containing radium, which process comprises adjustment of the final pH and decontamination of uranium and of radium to values such that the solutions, after treatment, can be discharged without harming the natural environment.

The extraction of uranium ores from open pit mines or from underground mines necessitates treating the drained waters whose flow rates can reach several hundreds of cubic metres. These drained waters contain various elements, particularly uranium and possibly radium, at concentrations which can be detrimental to the natural environment when they are discharged thereto. In addition, these waters generally have a pH which is also detrimental to the natural environment.

It is the same with liquid effluents resulting from the acid or alkaline treatment of uranium ores.

In order not to spoil the natural environment particularly the hydrogeological system into which the drained waters and the liquid effluents are discharged the concentration of these waters and effluents respectively in uranium and radium must be as low as possible. This explains the reason why very strict standards have been fixed relating to the pH and the maximum content of uranium and of radium for drained waters and liquid effluents. It is necessary, in fact, for the final pH of the solutions to be between 5.5 and 8.5, for the radium content to correspond to an activity equal or less than 10 pCi/l and for the uranium content to be equal to or less than 1.8 mg/l.

It is known to remove the radium by a treatment with barium chloride, which in the presence of sulfate ions, causes the formation of barium sulfate and of radium sulfate which precipitate.

As for the removal of the uranium, in the processes employed until now, resins or other adsorbants (for example titanium oxide) are used, which require large installations and often are subject to risk of clogging.

The problem not yet resolved until now is the process of treating drained water or effluents, containing uranium content both too low to justify setting up of a laborious resin unit, and too high to permit discharge to to the natural environment.

The difficulties associated with the removal of the uranium are correlated to several parameters and particularly to the fact that, in uraniferous solutions, the uranium occurs in various physical forms, namely solid, soluble and colloidal.

The solid particles of uranium are generally the subject of removal by decantation or filtration.

As regards the soluble particles, their existence is explained by the use of sulfuric acid to form acid waters for the lixiviation of the uranium or by the presence of carbonate or bicarbonate ions used to form alkaline waters enabling the lixiviation of the uranium.

As for the colloidal particles, they correspond to an intermediate state between the solid and soluble uranium and they generally have a size of $10^{-1}$ to $10^{-3}$ microns and cannot be removed by simple decantation or filtration.

It is particularly the coexistence in the same solution of soluble and colloidal uranium which makes it difficult to set up a efficient process for removal of the uranium.

Another parameter which plays a part in the elimination of uranium, is the presence of numerous other ions as well as the respective values of their concentration. Among these ions, maybe be mentioned calcium, sodium; magnesium, sulfate, carbonate, bicarbonate, chloride, potassium, nitrate, ferric, or aluminum ions.

It is one of the objects of the invention to provide a process for removing uranium from acid uraniferous solutions, whether the uranium is soluable and/or in colloidal form.

It is another object of the invention to provide a process for removing uranium from acid uraniferous solutions, applicable even to solutions highly charged with ions.

Another object of the invention is to provide a process for removing uranium from acid uraniferous solutions, whatever the nature of the ion species in solution.

Another object of the invention is to provide a process for removing uranium and radium, from acid uraniferous solutions, at the end of which the contents of uranium and of radium and the value of the pH of the final solutions obtained are compatible with the natural environment.

A further object of the invention is to provide a process for removing uranium and radium from acid uraniferous solutions, at the end of which the contents of uranium and radium as well as the value of the pH of the final solutions obtained, meet the legislative standards in force.

GENERAL DESCRIPTION OF THE INVENTION

According to the invention there is provided a process for treating, decontaminating and adjusting the pH of acid uraniferous solutions, said process comprising treating the solutions, having an initial pH of about 2.5 to about 6.5 or of which the pH is previously adjusted within the range of about 2.5 to about 6.5 and containing about 1 to 100 mg/l of uranium, adding an aluminium salt soluble in the solutions, and which salt, after hydrolysis in the solutions, results in the formation of $Al(OH)_3$ and is liable to account for an increase in the pH, the addition of this aluminum salt being effected in a sufficient amount so that the final pH is from about 5.5 to about 3.5, and so that there is precipitation, coagulation and adsorption of at least 90% of the uranium initially contained in the solution, and so that the content of uranium remaining in the final solution obtained, is equal to or less than 1.8 mg/l.

The acid uraniferous solutions treated according to the invention are either drained waters, or come from the acid lixiviation treatement of uranium ores.

The pH of the acid solutions, treated according to the process of the invention, is generally comprised from about 2.5 to about 5.5.

The uraniferous solutions treated according to the invention may also be liquors of initial pH of about 6.5 to about 8, previously acidified to pH of about 2.5 to about 6.5, particularly to about 2.5 to about 5.5, by the addition of a suitable amount of an acid.

The process according to the invention is advantageously applied to solutions whose initial pH is from about 6.5 to about 8, containing at least about 1 g/l of sulfate ions, and whose pH is previously brought to the value of about 2.5 to about 6.5, particularly from about 2.5 to about 5.5, by the addition of a suitable amount of acid, particularly sulfuric acid.

The uranium present in the acid uraniferous solutions, treated by the process of the invention is either in soluble form and/or in colloidal form.

In the acid solutions treated according to the process of the invention, the solubilised form and the colloidal form of the uranium generally coexist in respective proportions which depend on the pH and the nature of the ions in solution.

To fix ideas, it may be considered that within the pH range from about 2 to about 6, the uranium is to a large extent solubilised, particularly in the form of uranyl sulfate $UO_2(SO_4)_3^{4-}$, but it also exists in colloidal form.

On the other hand, it may be considered, within the pH range from about 6 to about 7.5, a fortiori from about 6 to about 6.5, that the uranium is essentially in colloidal form, which does not exclude the presence of uranium in solubilised form.

The aluminum salt used soluble in aqueous medium, particularly in the solutions to be treated, is hydrolysed after having been added to the solutions to be treated and there is formation of aluminum hydroxide $Al(OH)_3$, which can coagulate and adsorb the colloidal uranium present in the solution to be treated.

In other words, the aluminum salt plays the role of coagulant with respect to the colloidal uranium.

It is recalled that the colloidal form corresponds to a phase constituted by particles so small that the forces at the surface play on important part in its properties.

The sizes of the colloidal particles are from $10^{-1}$ to $10^{-3}$ microns. They are constituted by associations of molecules or by small crystals charged as a result of the adsorption of ions and thus separated from the solution by a double layer.

It is also recalled that the coagulant permits the separation of a colloidal suspension. This separation from the suspension necessitates recourse to artificial means. This operation is summarised by two different actions:

destabilisation by addition of chemical reagents which, by mechanisms of agregation or adsorption, cancel the repellent forces or act on the hydrophilic nature of the colloidal particles;

agglomeration of the "discharged" colloids: it results from various forces of attraction between particles placed in contact, first by Brownian movement until the obtention of a size of about 0.1 micron, then by external mechanical stirring bringing the flocks to a sufficient size.

The coagulating action of the aluminum salts used in the invention result from the hydrolysis which follows their dissolution, without leading immediately to the formation of aluminum hydroxide.

The intermediate compounds of aluminum, hydroxo-aluminous complexes, bring charges which are necessary for the neutralisation of the colloids hence creating bridges between the colloids and initiating the floculation process.

It should also be noted that pH plays every important play in the study of coagulation-flocculation phenomena.

In addition, the aluminum salt added to the solution to be treated is such that the aluminum form part of the anion, and the cation of this salt, after the hydrolysis of the abovesaid salt in the solution to be treated, can result in an increase in pH, which causes the precipitation of the uranium, particularly in the form of uranyl hydroxide.

The amount of aluminum salt to be added is such that, on the one hand, coagulant is formed sufficiently in the uraniferous solution to be treated, to coagulate and adsorb the colloidal uranium and such that, on the other hand, the pH is taken to a value from about 5.5 to about 8.5, a suitable value for the precipitation of the solubilised uranium.

In a preferred embodiment of the invention, the amount of aluminum salt added must be such that the final pH is from about 6 to about 7.5, since this pH range corresponds to the solubility minimum of the $Al^{3+}$ ions of the coagulant used and enables the coagulation and adsorption of the maximum of colloidal uranium contained in the solution to be treated.

If too much aluminum salt is added, the pH increases and exceeds the upper limiting value corresponding to the solubilisation minimum of the $Al^{3+}$ ions; the $Al^{3+}$ ions are then again found in the solution in stronger or weaker amounts according to the mineralisation of the solution, and the uranium is redissolved.

The use of the process of elimination of uranium according to the invention can allow the elimination of the totality of the uranium, but the elimination of at least about 90% is sufficient to obtain uranium contents below about 1.8 mg/l.

The examples indicated below, show that in practice, from about 95 to about 98% of the uranium initially present is eliminated.

Among the aluminum salts used in the process according to the invention, recourse is advantageously had to an aluminate of an alkali or alkaline earth metal or to ammonium aluminate.

It is also possible to contemplate the use of a mixture of aluminum salts.

In a prefered embodiment of the invention, sodium aluminate is used.

In aqueous medium, sodium aluminate behaves as indicated by the following reaction:

$$AlO_2Na + 2H_2O \rightarrow NaOH + Al(OH)_3$$

The sodium aluminate used is available commercially and is found in solution at the concentration of about 1,400 g/l of AlO Na and containing about 16% of $Al_2O_3$ and about 20% of $Na_2O$.

It is also possible to use sodium aluminate whose concentration is about 1,500 g/l of AlO Na and containing about 23% of $Al_2O_3$ and about 18% of $Na_2O$.

Instead of the aluminum salt, it is also possible to contemplate to add $Al(OH)_3$ directly, but this hydroxide being poorly soluble, it is more advantageous to resort to the preparation in situ of $Al(OH)_3$, by the addition to the solution to be treated of a soluble salt, since aluminum hydroxide thus freshly prepared is more active and does not account for a solubility problem.

In a preferred embodiment of the process according to the invention, when the initial pH of the solution to be treated is less than about 5, in a first step the pH of the solution is raised to the value of about 5, by the addition of a base, then in a second step, the aluminum salt is added to the solution to be treated.

By increasing the initial pH of the solution to be treated by the addition of the base, it is thus possible to remove about 60% of the uranium present in the initial solution; then an aluminum salt is added in suitable amount to obtain a solution whose pH is comprised from about 5.5 to about 8.5, particularly from about 6 to about 7.5, and to precipitate and coagulate the uranium remaining in the solution in solubilised and/or colloidal form; the coagulated and/or precipitated uranium is then removed and the final solution obtained contains uranium in an amount less than or equal to 1.8 mg/l.

The combination of these two steps has the advantage of reducing the amount of aluminum salt to be added and improving the removal of the uranium initially present in the solution to be treated.

As a base, soda is advantageously used, for example, at a concentration of about 300 to about 400 g/l, in a proportion of about 300 mg/l of solution to be treated.

According to another preferred embodiment of the process of the invention, about 10 to about 250 mg of aluminum salt per liter of solution to be treated is generally used.

The amount of aluminum to be added varies not only according to the amount of uranium to be removed but also according to the mineralisation of the solutions to be treated.

By mineralisation, is meant the presence in larger or smaller amounts of calcium, magnesium, sodium, sulfate, ferric, chloride, carbonate, bicarbonate, phosphate, potassium, nitrate, silicon, aluminum ions initially present in the solution.

Typical solutions of the invention contain:

from about 0 to about 6,000 mg/l of $SO_4^{--}$ ions
from about 0 to about 1,000 mg/l of $CO_3^{--}$ ions
from about 0 to about 2,000 mg/l of $HCO_3^-$ ions
from about 0 to about 600 mg/l of $Ca^{++}$ ions
from about 0 to about 200 mg/l of $Mg^{++}$ ions
from about 0 to about 3,000 mg/l of $Na^+$ ions
from about 0 to about 4,000 of $Cl^-$ ions
from about 0 to about 100 mg/l of $K^+$ ions
from about 0 to about 10 mg/l of $NO_3^-$ ions
from about 0 to about 60 mg/l of silicon ions with reference to $SiO_2$
from about 0 to about 10 mg/l of $Al^{3+}$ ions
from about 0 to about 5 mg/l of $Fe^{3+}$ ions
from about 0 to about 1 mg/l of $PO_4^{3+}$ ions By "highly mineralised" solutions is meant below, solutions in which the total concentration of ions is higher than 1 g/l.

Typical "highly mineralised" solutions treated by the process according to the invention contain for example:

from about 100 to about 600 mg/l of $Ca^{++}$
from about 100 about 200 mg/l of $Mg^{++}$
from about 200 to about 3,000 mg/l of $Na^+$
from about 500 to about 6,000 mg/l of $SO_4^{--}$
from about 100 to about 4,000 mg/l of $CL^-$ In the case of a highly mineralised solution, the aluminum salt is added in the proportion of about 50 to about 200 mg/l of solution to be treated.

By "weakly mineralised" solutions is meant below, solutions in which the total concentration of ions is less than 1g/l, particularly less than 0.5 g/l.

Typical "weakly mineralised" solution treated by the process according to the invention contain less than:

about 60 mg/l of $Ca^{++}$
about 60 mg/l of $Mg^{++}$
about 150 mg/l of $Na^+$, particularly about 25 mg/l of $Na^+$·
about 250 mg/l of $SO_4^{--}$ In the case of a weakly mineralised solution, the aluminum salt is added in the proportion of about 10 to about 100 mg/l of solution to be treated.

According to a preferred embodiment of the process of the invention, after the precipitation, the adsorption and the coagulation of the uranium, the solid particles of uranium thus formed are removed from the solutions, particularly by decantation.

A preferred embodiment of the process according to the invention comprises an additional step, whose purpose is the elimination of the radium, which may also be contained in the uraniferous solutions to be treated.

After the process as defined above for removing uranium, from acid uraniferous solutions, has been set up at the end of which the uraniferous solutions obtained can contain less than about 1.8 mg/l of uranium and have a pH comprised from about 5.5 to about 8.5, particularly from about 6 to about 7.5, the radium is removed by precipitating it in the form of radium sulfate by the addition, in the presence of sulfate ions, of barium chloride in sufficient amount for the content of radium ions remaining in the solution to correspond to an activity equal to or less than about 10 pCi/I.

The operation of eliminating the radium is done under conditions such that there are no substantial changes in the value of the pH of the solution obtained at the end of the elimination step of the uranium.

In the course of the precipitation of the radium sulfate, the barium sulfate, still present, also co-precipitates.

After this step, a separatation between the solid particules formed of radium and the solutions is carried out, particularly by decantation, which permits solutions to be obtained containing a concentration of uranium equal to or less than 1.8 mg/l and of radium such that it corresponds to an activity equal to or less than 10 pCi/l.

To simplify the expression "concentration of radium corresponding to an activity expressed in picocurie per liter (pCi/l)", in the rest of the description, the expression "concentration of radium in picocurie per liter (pCi/l)" will be used. For example, the expression "concentration of radium of 10 pCi/l" means "concentration of radium corresponding to an activity of 10 pCi/l".

It is also possible to proceed with the treatment of the elimination of the radium on solutions which have undergone the process of elimination of the uranium, as indicated above, but in which the soluble uranium particles formed have not been removed from the solutions.

At the end of the precipitation of the radium, separation is then effected of the solid uranium and radium particles, particularly by decantation, which permits solutions to be obtained containing a concentration of uranium less than or equal to 1.8 mg/l and a concentration of radium equal to or less than 10 pCi/l.

The uraniferous solutions to be treated contain generally from about 10 to about 2,000 pCi/l of radium.

The barium chloride used is available commercially and is delivered in the form of solutions containing about 350 g/l of barium chloride.

When barium chloride containing about 350 g/l of BaCl is used, the amount of barium to be added generally varies from about 10 to about 20 mg/l, according to the solutions to be processed.

The content of the uraniferous solutions advantageously treated by the process according to the invention is such that the sulfate ions are in sufficient amount for the precipitation of the radium to be almost complete and for the final solution obtained to contain less tha 10 pCi/l of radium.

It is interesting to note that taking into account the amounts of barium chloride generally used to treat the solutions of the invention, the content of chloride ions introduced by the barium chloride is very low, in the vicinity of about 5 mg/l, which content in general is very much less than the amount of chloride ions contained initially in the solutions to be treated.

According to another embodiment of the process of the invention, the steps constituted by the removal of the uranium and the removal of the radium may be reversed.

DESCRIPTION OF PREFERRED EMBODIMENTS

The following examples, given purely by way of indication, will permit a better understanding of the invention, but are not to be taken as in any way limiting the scope of the invention.

EXAMPLE 1

The process according to the invention is used to treat an acid uraniferous solution (drained waters) of initial pH 5.28, and containing:

2 mg/l of U
116 pCi/l of Ra
811 mg/l of $SO_4^{--}$
470 mg/l of $Ca^{++}$
<5 mg/l of $Al^{3+}$
<1 mg/l of $Fe^{3+}$
40 mg/l of $Mg^{++}$
25 mg/l of $Na^{+}$
24 mg/l of $Cl^{-}$
traces of $CO_3^{-}$
44 mg/l of $HCO_3^{-}$
<0.1 mg/l of $PO_4^{+++}$
29 mg/l of $SiO_2$
18 mg/l of $K^{+}$
8 mg/l of $NO_3^{-}$ To remove the uranium, sodium aluminate is added, in the proportion of about 100 mg/l of solution to be treated. The sodium aluminate used is marketed by the RHONE POULENC company. It is delivered in the form of a solution of about 1,400 g/l of $AlO_2Na$, containing about 16% of $Al_2O_3$ and about 20% of $Na_2O$.

To remove the radium, barium chloride is used, in a proportion of about 10 mg/l of solution to be treated. The barium chloride used is marketed by the Rhone Poulenc company. It is delivered in the form of a solution containing about 350 g/l of BaCl.

After treatment, the final pH is 6.92, the concentration of radium is 2 pCi/l and the concentration of uranium is 0.3 mg/l.

EXAMPLE 2

By the process according to the invention, an acid uraniferous solution (drained waters), of initial pH 2.77 containing no radium and containing:

7.5 mg/l of U
775 mg/l of $SO_4^{--}$
109 mg/l of $Fe^{3+}$
29 mg/l of $Al^{3+}$ *is treated.*

In a first step, soda is added, whose concentration is about 300 g/l, in the proportion of about 300 mg/l of solution to be treated. The pH of the solution so obtained is about 5.

This increase in pH leads to the precipitation of about 60% of the amount of uranium initially present, which can then be removed.

In a second step, sodium aluminate, having the same characteristics as in Example 1 is introduced, in the proportion of 200 mg/l of solution to be treated to remove the uranium still present in the solution.

The final solution obtained has a pH of 6.3 and uranium content below 0.1 mg/l.

EXAMPLE 3

In accordance with the process of the invention, the treatment is applied to a solution of initial pH 2.87 (drained waters), containing no radium, and containing 8.7 mg/l of uranium.

The respective contents of the $SO_4^{--}$, $Fe^{3+}$ and $Al^{3+}$ ions are in the vicinity of those indicated in Example 2.

In a first step, soda is added, whose concentration is about 300 g/l, in the proportion of about 300 mg/l to obtain a pH of about 5, which leads to the precipitation from the solution to be treated of about 60% of the uranium initially present.

In a second step, sodium aluminate is introduced having the same characteristics as in Example 2, in a proportion of about 100 mg/l of solution to be treated, to remove the uranium which is still present in the solution.

The final pH of the solution is 6.8 and the concentration of the uranium is less than 0.1 mg/l.

What is claimed is:

1. A process for reducing the uranium content of a uraniferous solution to render the solution compatible with the natural environment into which the solution may be discharged, said solution having a pH of about 2.5 to about 6.5 and containing from about 1 to about 100 mg/l uranium, said process comprising adding to said solution an aluminum salt soluble in said solution and which, after hydrolysis in the solution, results in the formation of $Al(OH)_3$ and an increase of pH of said solution, said aluminum salt being added in an amount sufficient to raise the pH of the solution to about 5.5 to 8.5 and sufficient to effect precipitation, coagulation and adsorption of at least about 90% of the uranium originally present in the solution.

2. A process according to claim 1 wherein the pH of said solution, prior to adding said aluminum salt, is about 2.5 to 5.5.

3. A process according to claim 1, wherein said aluminum salt is selected from the group consisting of ammonium aluminate, and aluminates of alkali or alkaline-earth metals.

4. A process according to claim 3, wherein said aluminum salt comprises sodium aluminate.

5. A process according to claim 1, wherein the aluminum salt is added in a proportion of about 10 to about 250 mg. per liter of solution to be treated.

6. A process according to claim 1 wherein the solution has an initial pH of less than 5 and wherein said process further comprises, prior to adding said aluminum salt, adding a base to said solution to raise its pH to about 5.

7. A process according to claim 6 wherein the aluminum salt is added in an amount sufficient to raise the pH of said solution to about 6 to 7.5.

8. A process according to claim 1 wherein said uraniferous solution has a pH of about 6.5 to about 8 and wherein said process further comprises, prior to adding said aluminum salt, adding acid to said solution in an amount sufficient to acidify the solution to a pH of about 2.5 to about 6.5.

9. A process according to claim 8 wherein said acid is added in an amount sufficient to acidify the solution to a pH of about 2.5 to about 5.5.

10. A process for reducing the uranium content of an aqueous uraniferous solution having a pH of about 5 or less and containing about 1 to 100 mg/l uranium; said process comprising the step of:

adding to said solution an aluminate selected from the group consisting of ammonium aluminate, alkali metal aluminates and alkaline earth metal aluminates to form $Al(OH)_3$ in said solution and increase the pH of said solution to about 6 to 7.5 and thereby coagulate and precipitate at least about 90% of the uranium originally present in said solution.

11. A process according to claim 10 wherein, prior to adding said aluminate to said solution, said solution has a pH of about 6.5 to 8 and an acid is added to said solution in an amount sufficient to lower its pH to about 5 or less.

12. A process according to claim 10 wherein said aluminate is sodium aluminate.

* * * * *